United States Patent [19]

North

[11] Patent Number: 4,574,911
[45] Date of Patent: Mar. 11, 1986

[54] SEAT BELT BUCKLE EMERGENCY RELEASE SYSTEM

[75] Inventor: Lawrence A. North, Dunstable, England

[73] Assignee: General Motors Corporation, Detroit, Mich.

[21] Appl. No.: 666,158

[22] Filed: Oct. 29, 1984

[30] Foreign Application Priority Data

Oct. 29, 1983 [GB] United Kingdom ............. 8328962

[51] Int. Cl.$^4$ .................................. B60R 21/00
[52] U.S. Cl. .......................... 180/270; 24/603; 280/801; 180/282
[58] Field of Search .............. 180/282, 268, 270; 280/801; 24/603; 200/61.58 B

[56] References Cited

U.S. PATENT DOCUMENTS

| 3,311,188 | 3/1967 | Gutshall | 180/270 |
| 3,905,440 | 9/1975 | Okada et al. | 180/270 |
| 4,081,052 | 3/1978 | Scharer | 180/270 |
| 4,345,665 | 8/1982 | Fohl | 180/270 |
| 4,410,061 | 10/1983 | Terabayashi | 180/270 |

FOREIGN PATENT DOCUMENTS

| 2363973 | 7/1975 | Fed. Rep. of Germany . |
| 618094 | 12/1978 | Fed. Rep. of Germany . |
| 3234486 | 9/1983 | Fed. Rep. of Germany . |
| 3217082 | 10/1983 | Fed. Rep. of Germany . |

Primary Examiner—Richard A. Bertsch
Attorney, Agent, or Firm—Charles E. Leahy

[57] ABSTRACT

A seat belt buckle emergency release system is provided for installation in conjunction with a seat belt system in a motor vehicle so that, in the event of the motor vehicle sustaining an impact of sufficient magnitude as to warrant emergency release of the seat belt system, an electrically-operable actuator in a seat belt buckle of the seat belt system is actuated to release the seat belt system a short predetermined time interval after the vehicle has come to rest. The emergency release system includes two omni-directional sensors 108, 110, incorporated in an electronic timing and actuator operation circuit controlling the actuation of the electrically-operable actuator in the seat belt buckle. Sensor 108 is responsive only to a predetermined high acceleration indicative of vehicle impact, and sensor 110 is responsive to a predetermined acceleration substantially lower than said predetermined high acceleration and indicative of substantial vehicle movement. Actuation of sensor 108 causes an electronic timer 126 to operate a relay 176 to actuate the electrically-operable actuator in the seat belt buckle through lines 178, 180, a predetermined short time delay period after actuation of sensor 108 occurs. If sensor 110 becomes actuated during this short time delay period after actuation of sensor 108, electronic timer 126 is re-set so that the predetermined time period starts again. The circuit is so designed that actuation of sensor 110 at any time outside the predetermined short delay period after actuation of sensor 108 does not cause actuation of the emergency release system. A preferred embodiment of the invention includes a manually-operable switch 156, the operation of which will check that the emergency release system is operational. The emergency release system of the present invention is additional to the normal manual release system of the seat belt system, and does not interfere in any way with the operation of such a manual release system.

7 Claims, 3 Drawing Figures

SEAT BELT BUCKLE EMERGENCY RELEASE SYSTEM

This invention relates to a seat belt buckle emergency release system for use in a motor vehicle, and, in particular, to a system which includes an automatic latch plate release mechanism, an impact sensing means, and a timing mechanism interposed between said release mechanism and said impact sensing means, whereby, when said system is installed in said motor vehicle and said motor vehicle sustains an impact of a predetermined magnitude, a latch plate engaged in said seat belt buckle is ejected automatically therefrom a predetermined short period of time after said impact.

It is customary in modern motor vehicles for the vehicle to be provided with seat belt systems for at least the driver and front seat passenger of the vehicle. Such seat belt systems commonly take the form of a flexible belt system which can be secured about the body of an occupant of the vehicle by means of a latch plate which can be releasably anchored in a seat belt buckle secured to the structure of the vehicle. The latch plate remains securely anchored within the seat belt buckle until released therefrom by the occupant depressing a manual release button on the seat belt buckle. In many European countries it is now becoming mandatory for the occupants of motor vehicles to wear seat belts whilst the vehicle is in motion. There are many people who find the wearing of such seat belts systems both unpleasant and undesirable, because they have an irrational fear that they may become trapped in the seat belt system in the event that the vehicle concerned is involved in an accident. It is therefore desirable to provide a seat belt buckle emergency release system, which is additional to the manual release system, and which would act automatically to release an occupant from a seat belt system very shortly after the motor vehicle concerned has sustained an impact of a magnitude sufficient to warrant possible rapid removal of the seat belt system from the occupant.

Such a seat belt buckle emergency release system has already been evolved in which the seat belt buckle is provided with an inbuilt impact sensing means, a timing mechanism and an automatic latch plate release mechanism, the impact sensing means operating by detecting the point at which the loading on a belt connected to a latch plate inserted in the seat belt buckle rises beyond the loading expected as a result of a person restrained by the belt sustaining a deceleration of the order of 5 g. Once this predetermined belt loading limit is reached, the latch plate moves outwardly of the seat belt buckle by a predetermined amount, thus triggering a mechanical timing mechanism within the seat belt buckle, which timing mechanism proceeds to run for a short time period of the order of 8 seconds. At the end of this short time period, the timing mechanism triggers the automatic latch plate release mechanism, which, in turn, ejects the latch plate from the seat belt buckle, thus releasing the seat belt system. The time delay period of approximately 8 seconds has been chosen on the basis that previous studies of motor vehicle accidents have shown that vehicle impacts of a magnitude sufficient to warrant rapid automatic release of the seat belt systems are effectively complete within such a time period.

Such a seat belt buckle emergency release system has two potential disadvantages, the first being that the response of the impact sensing means to the deceleration of the occupant of the seat belt system is dependent very much on the weight of the occupant, and that, secondly, automatic release of the latch plate will occur after the 8 second interval unless the latch plate is subjected to further loadings similar in magnitude to the loading which was originally sensed by the impact sensing means. This means that there is a possibility that a vehicle could be involved in an impact which results in the vehicle leaving the road in some fashion, and sustaining further impacts of a lesser magnitude for a period longer than 8 seconds before the vehicle finally comes to rest. In these circumstances, there is a possible risk that the seat belt buckle emergency release system would release the latch plate before the vehicle and occupant had come to rest, and this could be potentially harmful to the occupant. It is desirable, therefore, to devise a seat belt buckle emergency release system which avoids these possibilities.

A seat belt buckle emergency release system according to the present invention, for use in a motor vehicle, which system includes an automatic latch plate release mechanism, an impact sensing means, and a timing mechanism interposed between said release mechanism and said impact sensing means, whereby, when said system is installed in said motor vehicle and said motor vehicle sustains an impact of a predetermined magnitude, a latch plate engaged in said seat belt buckle is ejected automatically therefrom a predetermined short period of time after said impact, is characterised in that the latch plate release mechanism comprises an electrically-operable actuator coupled to a manual release mechanism of the seat belt buckle, the impact sensing means includes two acceleration-responsive sensing means, one of which is responsive only to a predetermined high acceleration indicative of vehicle impact and the other of which is responsive to a predetermined acceleration substantially lower than said predetermined high acceleration and indicative of substantial vehicle movement, and the timing mechanism is incorporated in an electronic timing and actuator operation circuit connected between said sensing means and, when the system is installed in said motor vehicle, said actuator, so that, when said motor vehicle sustains said impact, the timing portion of the circuit is actuated by said one sensing means to produce a set short time delay period before an electrical signal is generated by the actuator operation portion of the circuit to operate the actuator in the buckle, and any actuation of said other sensing means during said set short time delay period re-sets the timing portion to the starting point of said set short time delay period, whereby automatic ejection of said latch plate from said buckle will not occur before the vehicle has come to rest.

In a preferred embodiment of the invention, described in detail hereafter, the two acceleration-responsive sensing means are provided in the form of two separate sensors. Alternatively it is feasible for the two acceleration-responsive sensing means to be provided by one sensor having two separate levels of response, one level corresponding to said predetermined high acceleration and the other corresponding to said predetermined acceleration substantially lower than said predetermined high acceleration. For example, such a sensor having a two-level response could be a sensor of the type incorporating a ball-like member retained within a dish-shaped housing, the movement of the member relative to the housing as a result of acceleration forces detected by the sensor causing the closure of electrical contacts within the sensor. Initial movement of the ball-like member would be prevented by a magnetic field generated by an electrically-energisable solenoid coil positioned beneath the base of the housing, until the sensor is subjected to said predetermined high acceleration. Once the sensor has responded to this predetermined high acceleration, tha magnetic field is switched off, allowing the ball-like member to react to said predetermined substantially lower acceleration.

It should be understood that the term "acceleration" as used in this specification is being used in its widest sense to include rates of change of velocity both in a positive sense and in a negative sense, and the acceleration-responsive sensing means can respond to acceleration forces experienced in virtually any direction.

Preferably the electrically-operable actuator of the invention is coupled to the manual release mechanism through a coupling means which, when said vehicle sustains said impact, is rendered disabled if the load exerted on a belt connected to said latch plate by a vehicle occupant restrained by said belt remains above a predetermined minimum loading after said impact, and remains disabled until the exerted load falls below said minimum loading, so as to prevent automatic ejection of said latch plate in the event of said vehicle occupant being suspended by said belt after the vehicle has come to rest. Such a situation could occur if the vehicle has come to rest upon its roof, and the occupant of the seat belt system is being suspended on the belts of the system. If the weight of the occupant on the belts is then removed, either by the occupant consciously unloading the belts or rescuers lifting the occupant away from the belts, the coupling means is no longer disabled, and ejection of the latch plate from the seat belt buckle occurs.

In a preferred embodiment of the present invention, in which the electrically-operable actuator comprises a solenoid having a movable armature, latch means are provided between the movable armature and other components of the belt buckle latch plate release mechanism to retain said armature in a position to release the latch plate after the electrical signal from the actuator operation portion of the circuit ceases, until physical ejection of the latch plate occurs. Such an arrangement ensures that the electrical signal need only be a brief electrical signal in order to obtain a positive release of the latch plate, and this avoids the possibility of non-actuation of the emergency release system due to power failure in the circuit caused by the vehicle impact. As a further safeguard, it may also be desirable to provide at least one electrical back-up system to avoid this possibility of power loss causing inoperation of the emergency release system. It is desirable, in this preferred embodiment of the present invention, for the movable armature of the solenoid to be spring-biased towards said manual release mechanism, so as to avoid any possibility of this movable armature interfering with the latching action of the seat belt buckle.

It is feasible to provide impact sensors and an electronic timing and actuator operation circuit according to the present invention for each of the seat belt buckles in a motor vehicle, but, preferably, it is envisaged that each vehicle equipped with the seat belt buckle emergency release system according to the present invention will have the two sensing means and the electronic timing and actuator operation circuit located within the motor vehicle, preferably in a centralised position, with the actuator operation portion of the circuit connected to respective electrically-operable actuators positioned in the seat belt buckles of the seat belt systems in the motor vehicle. In such an arrangement, in the event of the vehicle sustaining an impact sufficient to cause operation of the seat belt buckle emergency release system, all of the electrically-operable actuators in the seat belt buckles would be triggered simultaneously after the vehicle has come to rest, thus ejecting automatically any latch plates engaged in those buckles.

In a system according to the present invention wherein two separate sensors are used, it is not essential that these two sensors be installed adjacent one another, and, advantageously, the sensor responsive to said lower acceleration should be mounted in the vehicle in an area subject to maximum movement whilst the vehicle is in motion.

A preferred feature of the present invention is to include in the electronic timing and actuator operation circuit a manually-operable test switch, situated, for example, on the dashboard of the vehicle, the operation of which switch causes automatic ejection of the latch plates from their respective buckles to test the operability of the emergency release system. This manually-operable test switch is incorporated in the circuit in such a fashion that it is disabled as soon as said vehicle sustains an impact of sufficient magnitude as to cause operation of the emergency release system, and it stays disabled until the vehicle has subsequently come to rest after that impact. Such an arrangement safeguards against the possibility of premature ejection of the latch plates from the seat belt buckles due to any unintentional closure of the switch caused during the vehicle impact.

The invention and how it may be performed are hereinafter particularly described with reference to the accompanying drawings, in which.

Figure 1:
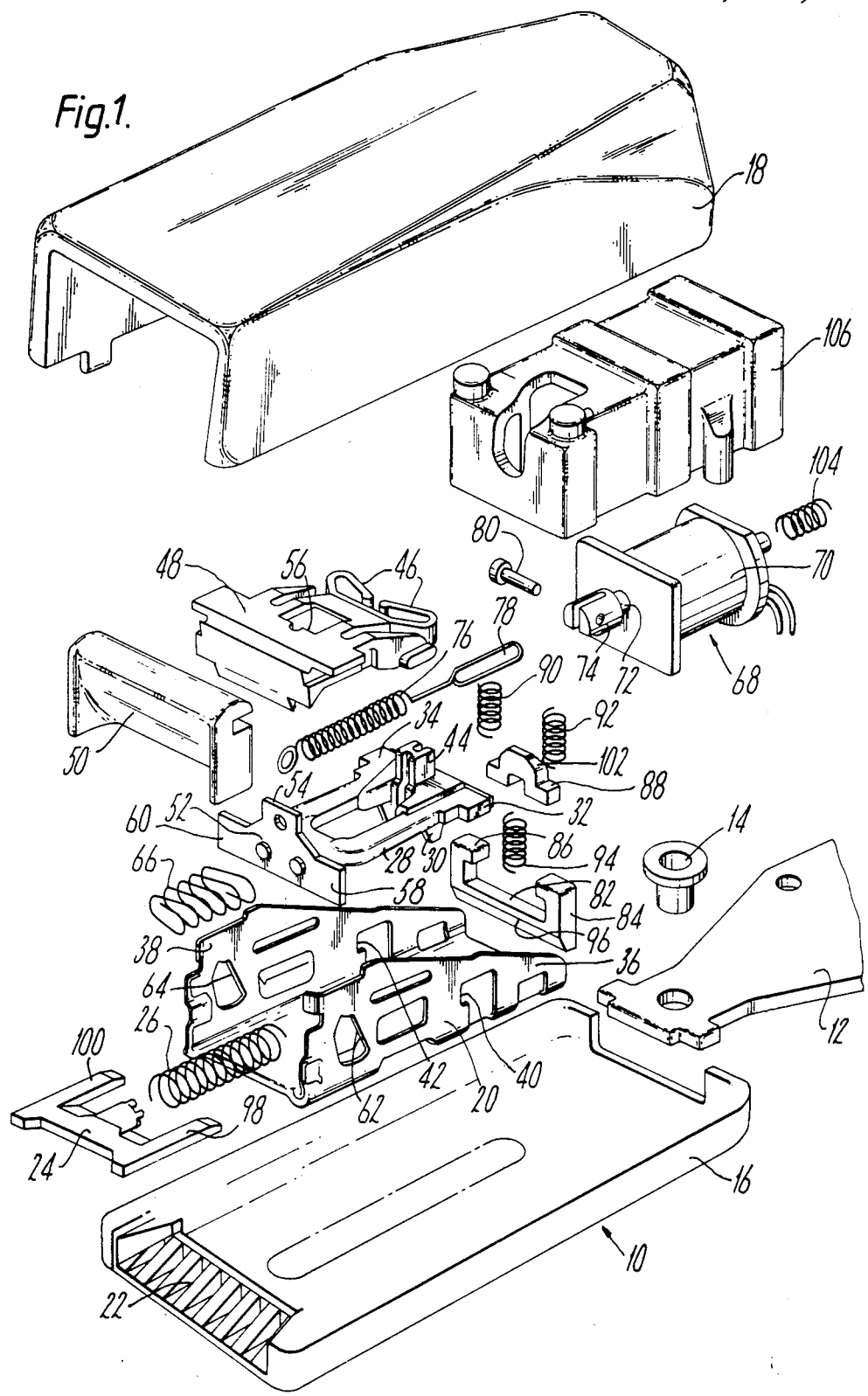
FIG. 1 shows an exploded view of a seat belt buckle equipped with an electrically-operable actuator of a seat belt buckle emergency release system according to the present invention.

Turning now to FIG. 1 of the accompanying drawings, this shows an exploded view of a seat belt buckle 10 which is attached to a seat belt anchoring member 12 by means of a rivet 14. The seat belt buckle 10 comprises a base tray 16 and a cover 18, which together act as a housing for the separate mechanical components of the buckle. Mounted inside the base tray is a channel-shaped frame 20, an open end of which is shaped to receive a latch plate (not shown) for the buckle, and is aligned with a mouth portion 22 of the base tray 16. Slidably mounted within the base of the channel-shaped frame 20 is a latch ejector 24, which is spring-loaded by coil spring 26 towards the mouth 22 of the base tray 16. A detent plate 28, having a detent pawl 30 and mounting lugs 32, 34, is movable mounted within side walls 36 and 38 of the channel-shaped framed 20, the mounting lugs 32, 34 being received within shaped apertures 40, 42 in these side walls 36, 38. There is an upstanding boss 44 on the detent plate 28, which boss 44 is located adjacent resilient legs 46 of a manual latch release member 48 slidably mounted between the side walls 36 and 38 of the frame 20 directly above the detent plate 28. A manual release button 50 is secured to a forward edge of this manual latch release member 48. An inverted T-shaped servo-bar 52 is located between the manual release button 50 and the detent plate 28, with an upright leg 54 thereof located within an aperture 56 in the manual latch release member 48. Side legs 58, 60 of the servo-bar 52 are respectively located within wedge-shaped apertures 62, 64 in the side walls 36 and 38 of the frame 20, so that the servo-bar 52 can pivot about the edges of these wedge-shaped apertures. The servo-bar 52 is biased toward the detent plate 28 by means of a coil spring 66 located between the servo-bar 52 and the manual release button 50.

The components of the belt buckle described so far are part of a standard commercial design of seat belt buckle which operates in conjunction with a flat latch plate having a central slot-like aperture therein. The introduction of such a latch plate into the mouth 22 of the base tray 16 and thence into the open end of the channel-shaped frame 20 pushes back the slidable latch ejector 24 against the bias of the coil spring 26 and causes detent plate 28 to pivot downwards within the apertures 40, 42 by reason of the engagement of the detent pawl 30 with the end of the latch plate. This, in turn, results in the servo-bar 52 pivoting in the wedge-shaped apertures 62, 64 under the bias of spring 66 so that a bottom edge of the servo-bar 52 moves over a forward end of the detent plate 28. The latched position of the latch plate is reached when the detent plate 28 enters the central slot in the latch plate, which allows the detent plate 28 to pivot downwards. Detent plate 28 is prevented from pivoting too far in an upwards direction by the forward end of the detent plate 28 contacting the lower edge of the servo-bar 52. This ensures that the detent plate 28 latches the latch plate securely in position against the spring bias exerted on the end thereof by means of the slidable latch ejector 24. The latch plate is released from its latched position by manual pressure exerted on the manual release button 50 in a direction towards buckle anchorage member 12. This manually-exerted pressure moves the manual latch release member 48 firstly against the upright leg 54 of the servo-bar 52, and then, via the resilient legs 46 against the upstanding boss 44 on the detent plate 28. Consequently, servo-bar 52 pivots within the wedge-shaped apertures 62, 64 to free the lower edge of servo-bar 52 from contact with the forward end of the detent plate 28, thus allowing the detent plate 28 to pivot upwards within the apertures 40, 42 under the spring bias exerted thereon from the resilient legs 46 and the coil spring 26, to allow the detent plate 28 to move out of the central slot in the latch plate. Once this unlatching position is reached, the spring-loaded slidable latch ejector 24 ejects the latch plate out of the mouth 22 of the base tray 16 of the buckle 10.

Additional to the manual latch release mechanism described hereinbefore, the buckle 10 also includes an electrically-operable actuator 68 in the form of a solenoid 70 having a movable armature 72 carrying on one free end thereof a notched connecting member 74. A coupling means is provided between the notched connecting member 74 and the upright leg 54 of the servo-bar 52, which connecting means comprises a coil spring 76 and a connecting lug 78, a forward end of the coil spring 76 being anchored within an aperture in the upright leg 54, the coil spring 76 extending across the top of the manual latch release member 48, and the connecting lug 78 being attached to the notched connecting member 74 by means of a connecting pin 80. A spring-loaded latching device is provided for the movable armature 72, which spring-loaded latching device comprises a wedge-shaped bar member 82 the free ends of which are formed as inverted L-shaped end pieces 84, 86, between which is movably located a stepped latching member 88, this stepped member 88 being spring-biased between the two end pieces by means of the coil spring 94. Coil springs 90, 92 spring-bias wedge-shaped bar 82 towards base tray 16. A forward face 96 of the wedge-shaped bar 82 is designed to engage with rearwardly extending legs 98, 100 of the slidable latch ejector 24, and a wedge-shaped upper surface 102 of the stepped latching member 88 is designed to engage with the notched connecting member 74. This spring-loaded latching device is movably situated within the channel-shaped frame 20 so that, upon insertion of the latch plate into the belt buckle, the rearwardly extending legs 98, 100 of the slidable latch ejector 24 move the wedge-shaped bar member 82 upwards so as to bias the wedge-shaped upper surface 102 in contact with the movable armature 72. The movable armature 72 is retained in a extended position relative to the solenoid 70, when the solenoid 70 is unenergised, by means of a bias spring 104, and the whole of the electrically-operable actuator 68 is covered by a protective cover 106.

Energisation of the solenoid 70 by means of an electrical signal pulse will cause retraction of the movable armature 72 within the solenoid 70, thus tensioning the coil spring 76 and causing the servo-bar 52 to pivot within the wedge-shaped aperture 62, 64 to release the forward edge of the detent plate 28, and to allow the ejection of the latch plate from the seat belt buckle by means of the slidable latch ejector 24. During retraction of the movable armature 72, the wedge-shaped upper surface 102 of the stepped latching member 88 engages with the notched connecting member 74 so as to retain the movable armature 72 in its retracted position after the solenoid 70 becomes de-energised. The movable armature 72 remains in this latched position until the slidable latch ejector 24 has completed the task of ejecting the latch plate from the seat belt buckle. Once this has happened, the wedge-shaped bar member is free to descend within the channel-shaped frame 20, thus decreasing the spring bias exerted upwards on this stepped latching member 88 to a degree which allows the combined spring forces exerted by coil spring 76 and bias spring 104 to overcome the spring bias of the coil springs 90, 92 and 94 in the spring-loaded latching device. Consequently, the notched connecting member 74 rides over the wedge-shaped upper surface 102 of the stepped latching member 88 and the movable armature 72 returns to its extended position relative to the solenoid 70.

Thus it can clearly be seen that the seat belt buckle is provided with an electrically-operable actuator which, upon actuation, will cause the ejection of the latch plate from the buckle independently of the manual release mechanism of the buckle, without interfering, in any way, with the operation of the manual release mechanism of the buckle. The spring-loaded latching device of the electrically-operable actuator 68 ensures that the actuator will operate to release the latch plate from the buckle upon the receipt of an electrical signal pulse even though that signal pulse may be of very short duration. The use of the coil spring 76 in the coupling means to the electrically-operable actuator has the useful extra safety feature of ensuring that emergency release of the latch plate from the buckle by means of the electrically-operable actuator 68 will not occur if the loading exerted on the latch plate by a belt attached thereto exceeds a predetermined loading. The predetermined loading referred to would be the loading exerted on a belt attached to the latch plate by reason of the seat belt system carrying the full weight of an occupant thereof, as might be the situation if the motor vehicle in which the seat belt system is installed has been involved in an accident resulting in the vehicle rolling on to its roof, so suspending the occupant of the vehicle by the seat belt system. The ejection of the latch plate from the seat belt buckle under circumstances where such a predetermined loading of the latch plate occurs is prevented by the force exerted on the detent pawl 30 by the latch plate, which causes the detent plate 28 to jam firmly against the lower edge of the servo-bar 52 and retain the latch plate firmly latched within the buckle. Under these circumstances, energisation of the solenoid 70 will still cause retraction of the movable armature 72 into the latched position, but this movement will not be transmitted to the servo-bar 52, but will be taken up by the extension of the coil spring 76 until the predetermined loading is removed from the latch plate. Once this happens, coil spring 76 will contract, thus pivoting the servo bar 52 out of engagement with the detent plate 28, and allowing immediate ejection of the latch plate from the seat belt buckle. Thus, in circumstances where the seat belt system is under said predetermined loading and the emergency release system has been triggered, release of an occupant from the seat belt system will occur immediately the weight of the occupant is removed from the seat belt system.

It will be clear from the foregoing description that emergency release of the latch plate from the seat belt buckle according to the present invention is achieved by supplying a suitable electrical signal pulse to the electrically-operable actuator 68 situated within the seat belt buckle 10. Turning now to the impact detecting system for generating the necessary electrical signal pulses, an impact detecting system, incorporating an electronic timing and actuator operations circuit according to the present invention, is shown in the circuit diagram of FIG. 2 of the accompanying drawings. As can be seen in the circuit diagram of FIG. 2, the circuit includes two acceleration-responsive sensors 108 and 110, each of these sensors being of the omni-directional type, that is, they are capable of detecting, when installed in a motor vehicle, acceleration forces generated within that vehicle in virtually any direction. Sensor 108 is responsive only to a predetermined high acceleration, of the order of 5 g., indicative, when installed in a motor vehicle, of that motor vehicle being subjected to a substantial impact likely to cause substantial damage to the vehicle structure, and sensor 110 is a sensor which is responsive to a predetermined acceleration, of the order of 0.5 g, which is substantially lower than the predetermined high acceleration of sensor 108, and is indicative, when installed in a motor vehicle, of substantial movement of that vehicle. These sensors 108, 110 are wired in parallel with one another in a circuit designed to produce a regulated voltage of 12 volts from a maximum supply of 30 volts on line 112, by means of a conventional voltage regulator circuit 114.

Sensor 108 is connected electrically across a ground potential line 116 and a regulated voltage line 118 via a resistor 120. A junction between sensor 108 and resistor 120 is connected to a capacitor 122, which is connected, in turn, to a junction with a resistor 124 and pin 6 of an integrated circuit timer 126. Pins 1 and 2 of timer 126 are coupled together and are coupled to a junction 128 to which is connected a resistor 130, a capacitor 132 and the emitter of a PNP transistor 134. The collector of transistor 134 is connected to the ground potential line 116, and the base of the transistor 134 is connected to a junction 136, to which is connected a resistor 138 and one side of a capacitor 140. Sensor 110 is connected electrically between the ground potential line 116 and the regulated voltage line 118 via a resistor 142, there being a junction between sensor 110 and resistor 142 to which is coupled the other side of the capacitor 140. Pin 4 of timer 126 is connected to a junction 144 between a resistor 146 and a capacitor 148, there being a junction between junction 144 and resistor 146 which is connected to pin 10 of timer 126. Pin 5 of timer 126 is connected to junction 150, to which is connected one side of a capacitor 152, the other side of this capacitor 152 being connected to the ground potential line 116. Junction 150 is connected to a junction 154 and one terminal 155 of a manually-operable switch 156. Junction 154 is connected to one side of a capacitor 158, the other side of which is connected to a junction 160 to which is connected pin 8 of timer 126 and a resistor 162. Junction 160 is also connected to a junction 164 between another terminal 165 of the manually-operable switch 156 and one side of a capacitor 166, the other side of which capacitor is connected to a third terminal 167 of the manually-operable switch 156.

Pin 9 of timer 126 is connected to a junction 168 via a diode 170, which junction 168 is connected to the ground potential line through another diode 172 and is connected to one end of a coil 174 of a relay 176, which relay controls the flow of electrical current through lines 178, 180 connected to one or more electrically-operable actuators 68.

When the seat belt buckle emergency release system of this embodiment of the invention is unactuated, sensors 108 and 110 are non-conducting and the manually-operable switch is in an open position where terminals 165 and 167 are connected together. With the system in this state, no current is flowing in the relay coil 174 and consequently there is no current flowing to any of the electrically-operable actuators of the seat belt systems associated with the circuit. Also with the system in this state, the capacitors 122 and 140 are discharged, the pins 1 and 2 of timer 126 are at ground potential, capacitor 132 is discharged and transistor 134 is non-conducting.

Consider now the situation where the seat belt buckle emergency release system according to this embodiment of the invention is installed in a motor vehicle, and the motor vehicle sustains an impact sufficient to close the electrical circuit in sensor 108 and sensor 110. When this occurs, capacitor 122 charges through sensor 108 and resistor 124, until discharged by current passing through resistor 120 upon opening of sensor 108. This charge of capacitor 122 creates a negative pulse on pin 6 of timer 126 placing this pin at a logic level 0 and pin 5 at a logic level 1. Simultaneously, pins 1 and 2 are open-curcuited, and capacitor 132 commences to charge through resistor 130. When the charge level in capacitor 132 reaches a predetermined value, the internal circuitry of timer 126 restores the logic level of pin 5 to a logic level 0. The negative pulse thus generated at pin 5 is transmitted through capacitor 158 and junction 160 to pin 8 of the timer 126, which pin goes from a logic level 1 to a logic level 0. This, in turn, causes the logic level of pin 9 to go from a logic level 0 to a logic level 1, thus generating a pulse through junction 168 to coil 174 which switches on the relay 176 to supply current to the electrically-operable actuators 68 in the seat belt buckles of the seat belt systems in the motor vehicle, thus causing the ejection of the respective latch plates from those seat belt buckles containing same. The time period taken for capacitor 132 to recharge is of the order of 8 seconds. The duration of the pulse generated at pin 9 in order to switch on the relay 176 is governed by the circuit connecting pins 12, 13 to capacitor 182 and resistor 184. This part of the circuit acts in an exactly similar fashion as the part of the circuit involving pins 1 and 2, in that, when the system is unactuated, capacitor 182 is discharged and pins 12 and 13 are earthed. When pin 8 goes to a logic level 0, pins 12 and 13 are open-circuited, capacitor 182 is charged through resistor 184 up to a predetermined voltage, and then the internal circuitry of timer 126 changes the logic level of pin 9 from logic level 1 back to logic level 0. This process takes something of the order of 1 second. Thus, in summary, when the vehicle sustains an impact which operates sensor 108, a delay period of 8 seconds occurs before the generation of a 1 second pulse of electricity to the relay 176, which 1 second pulse is sufficient to trigger the respective electrically-operable actuators 68 in the respective set belt buckles 10 of the system, each of the movable armatures 72 moving back into latching engagement with the respective spring-loaded latching device for the actuator, this 1 second pulse of electricity being so brief a duration as to make it possible to utilise small, short cycle solenoids 70 in the respective actuators 68.

Consider now the situation where the vehicle concerned has been subject to an impact sufficient to trigger sensor 108, and then, before the delay period of 8 seconds occurs, the vehicle is subject to one or more secondary impacts insufficient to operate sensor 108, but sufficient to operate the more sensitive sensor 110. This sensor 110 would, of course, have been triggered at the time of the triggering of the sensor 108, and, in so doing, would have earthed capacitor 140. This in turn would take junction 136 down towards ground potential, and would switch transistor 134 on. This would cause junction 128 to be provided with another connection to the ground potential line 116, but, since junction 128 is already at earth potential, this would have no effect upon capacitor 132. When the vehicle is subjected to the secondary impact, however, a negative pulse will be generated at junction 136 at each impact, turning on the transistor 134 each time this happens. This will result in the charge building within capacitor 132 being discharged to ground potential line 116 through junction 128 and transistor 134. Capacitor 132 will not commence to recharge again until transistor 134 switches off. When this happens, capacitor 132 starts to recharge through resistor 130 and, provided no further secondary impacts are received, will reach the necessary voltage required to actuate the internal circuitry of the timer 126 within the predetermined time delay period. Thus, it can be seen that, each time a secondary impact occurs that triggers sensor 110, the nett effect is to put the timing sequence of timer 126 back to the beginning of the predetermined time delay period of the order of 8 seconds. Thus, for example, if the predetermined time period is 8 seconds and a secondary impact occurs 4 seconds after the commencement of this initial period, then the actual time delay period taken for the generation of an electrical pulse from pin 9 of timer 126 will in actual fact be 12 seconds after the initial closure of the sensor 108. This means, effectively, that the emergency release system will not be actuated until the predetermined time delay period of the order of 8 seconds occurs after the vehicle has come to rest. Such an arrangement avoids the possibility that the vehicle could be in a series of subsidiary impacts which could cause damage to an occupant of the seat belt system if the seat belt system unlatched prematurely before the vehicle comes to rest.

Figure 2:
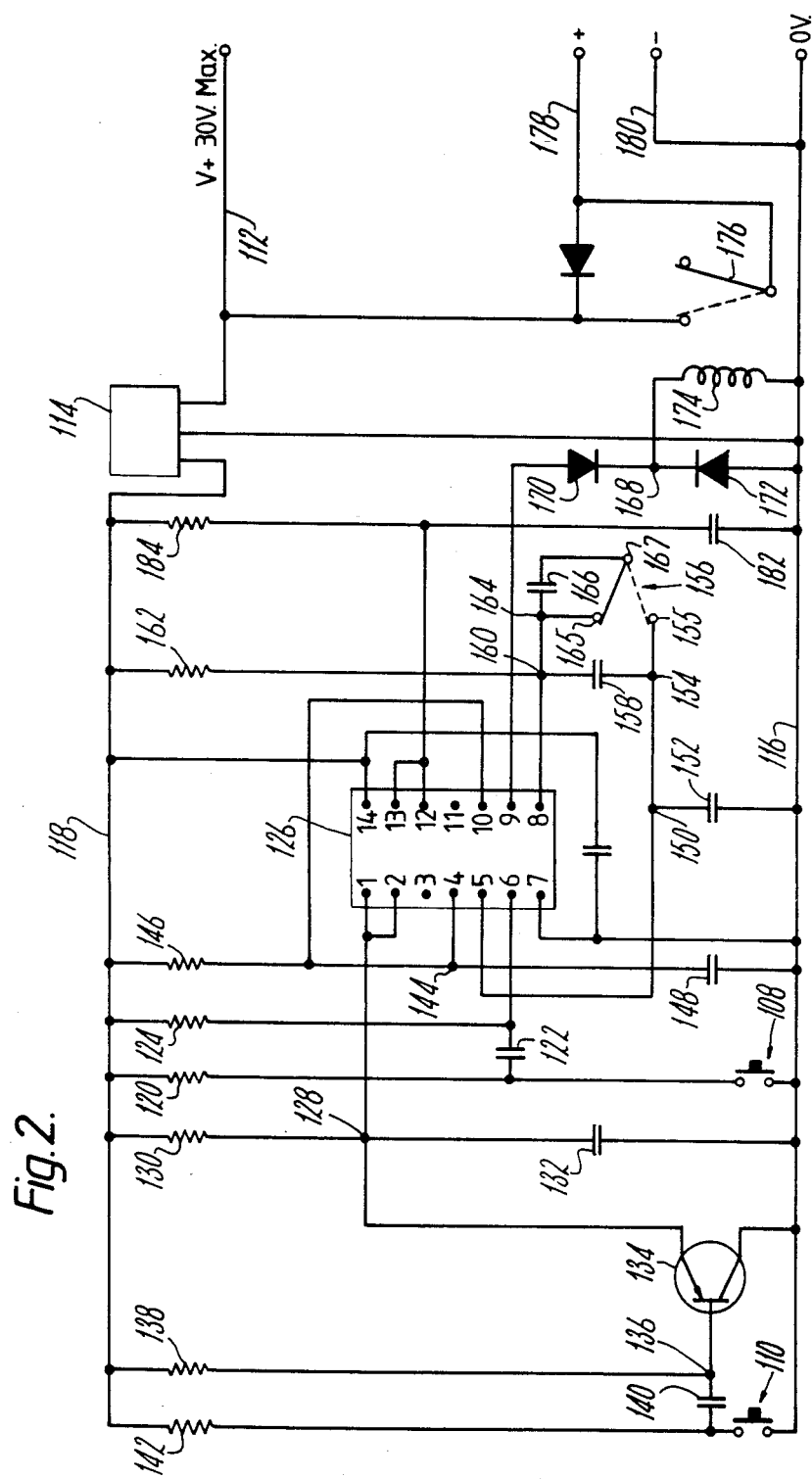
FIG. 2 shows a circuit diagram for an electronic timing and actuator operation circuit of one embodiment of the present invention.

The circuit shown in FIG. 2 incorporates a manually-operable switch 156, preferably located on the dashboard of the vehicle in which the seat belt buckle emergency release system is installed, so that the occupants of the vehicle can reassure themselves that the emergency release system is functional within the vehicle. Closure of the manually-operable switch 156 by breaking the connection between terminals 165 and 167 and joining the connection between terminals 155 and 167 produces a negative going pulse to pin 8 which is sufficient to trigger a positive pulse on pin 9 sufficient to trigger the relay 176 to operate the respective actuators 68 in the seat belt buckles 10. This test facility is only effective whilst pin 5 is at a logic level of 0, that is, all the time the emergency release system is unactuated. Once the timing sequence of timer 126 commences to operate, pin 5 goes to a logic level 1, and actuation of the manually-operable switch 156 during this period has no effect. Consequently, the manually-operable switch 156 stays disabled until the timing sequence of timer 126 is completed and a trigger pulse is generated at pin 9 of the timer 126.

It is important in a circuit of this type that the circuit be protected from premature triggering of the emergency release system. Such premature triggering is most likely to occur when the system is initially powered up. To prevent this happening, a power re-set circuit is provided between pins 4 and 10 of the timer 126 which operates on the basis of the discharge of capacitor 148 upon switching on the circuit which retains junction 144 at a low potential initially until the capacitor 148 is recharged through resistor 146. Once capacitor 148 is recharged to a predetermined voltage level, the internal circuitry of timer 126 is then ready to receive pulses directed to the other pins of the timer 126.

It will be appreciated by a man skilled in the art that both sensors 108 and 110 have been incorporated into the circuit in such a fashion that the circuit will only respond to the momentary actuation of each of these sensors. Thus, for example, if either of these sensors actuates and remains actuated, only the initial pulse generated by this actuation can have any effect on the system. Moreover, the system is so arranged that the momentary actuation of sensor 110 has no effect on the circuit unless actuation of the sensor 108 has also occurred within the predetermined time delay period required for sensor 108. This disablement of sensor 110 is achieved by pins 1 and 2 of timer 126 being maintained at earth potential until pin 6 goes to a logic level of 0, and this cannot happen until sensor 108 is actuated.

Figure 3:
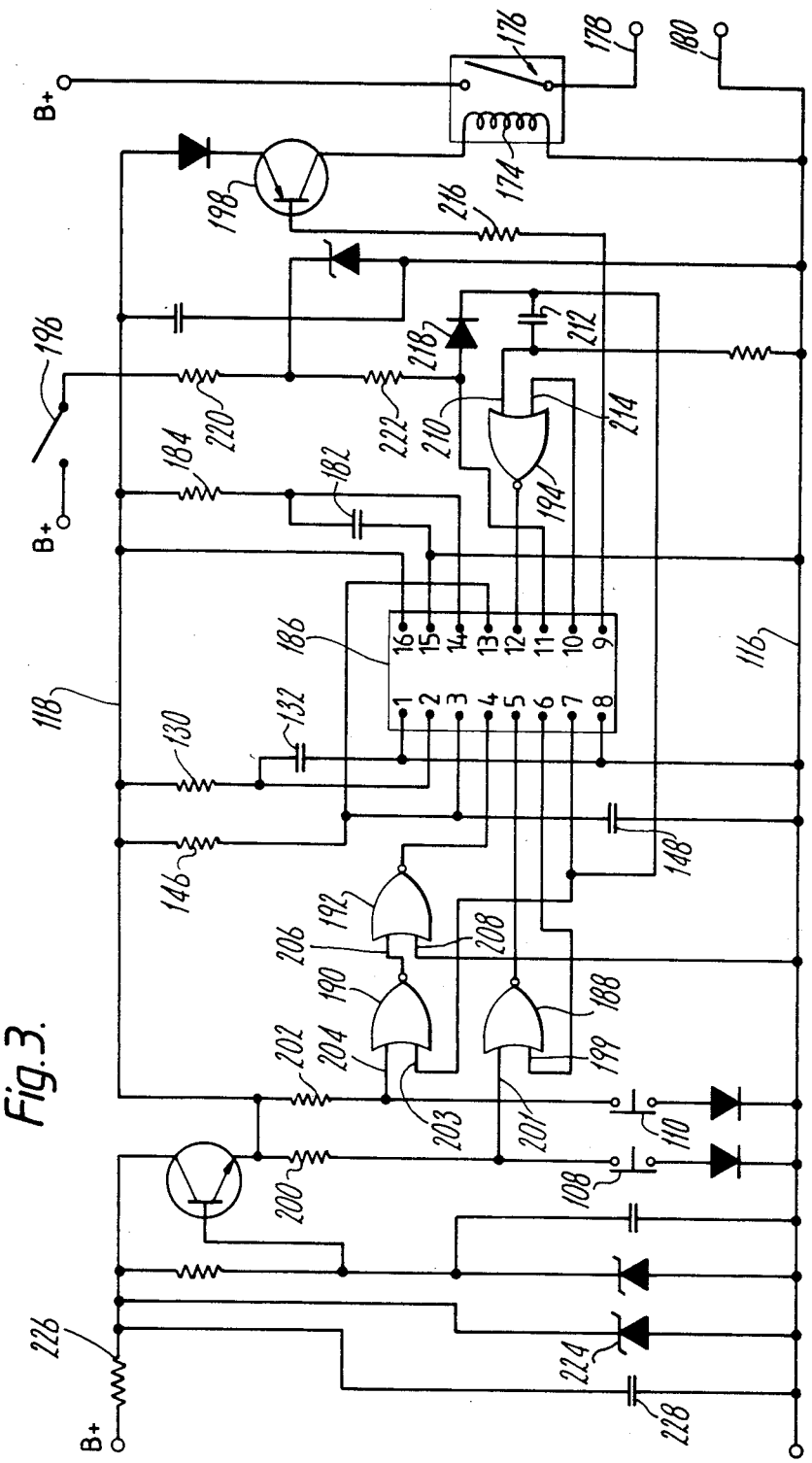
FIG. 3 shows an alternative electronic timing and actuator operation circuit for a second embodiment of the present invention.

A second embodiment of the present invention has an electronic detection, timing and actuation system as shown in the circuit diagram of FIG. 3 of the accompanying drawings. This circuit operates in a very similar fashion to the circuit of FIG. 2, achieving the same results as the circuit in FIG. 2, but utilising slightly different components. Consequently, those components in this circuit having a similar function to similar components in the circuit of FIG. 2 are identified by the same reference numerals. The circuit shown in FIG. 3 utilises a CMOS type of integrated circuit timer 186 in conjunction with a single integrated circuit containing, effectively, four NOR gates 188, 190, 192 and 194, and the three lead manually-operable switch 156 of the circuit of FIG. 2 is replaced by a single lead switch 196 directly connected to a source of battery potential B+. Such a timer can be derived from, for example, a Motorola MC 14538B multivibrator device. The timer 186 of this circuit will not produce a pulse of sufficient magnitude to pass directly through coil 174 of relay 176 in order to actuate the relay, so a PNP transistor 198 is placed in the circuit of coil 174, which transistor 198 is switched on and off by pulses generated at pin 9 of timer 186.

When the sensors 108, 110 in this circuit are unactuated, pin 6 of timer 186, which is connected to one input 199 of NOR gate 188, is maintained at a logic level of 0, and the other input 201 of NOR gate 188 is maintained at a logic level 1 by means of a resistor 200. The output from NOR gate 188 is connected to pin 5 of timer 186, and thus maintains pin 5 at a logic level of 0. Pin 7 of timer 186, which is connected to one input 203 of NOR gate 190, is maintained at a logic level 1, and the other input 204 to NOR gate 190 is maintained at a logic level 1 by means of the resistor 202. The output 206 from NOR gate 190, which is at a logic level of 0, constitutes one input to NOR gate 192, the other input 208 to NOR gate 192 being connected to the ground potential line 116. The output of NOR gate 192, which is at a logic level 1, is connected to pin 4 of timer 186. In this initial state, NOR gates 190 and 192 are latched via the output from pin 7, which is at logic level 1, and thus pin 4 is isolated from any input signal generated by sensor 110. The resistor 130 and capacitor 132 which form the resistor-capacitor network for determining the time delay period for timer 186 are connected to pins 1 and 2 of timer 186 in such a fashion that capacitor 132 remains charged all the time the sensors 108 and 110 remain unactuated.

When the vehicle in which the second embodiment of the invention is installed sustains an impact sufficient to trigger sensor 108, this causes the input 201 of NOR gate 188 to change to a logic level 0, which causes pin 5 of timer 186 to go to logic level 1, and discharges capacitor 132 to commence the time delay period. Once pin 5 goes to logic level 1, pin 6 goes to logic level 1, and this effectively latches NOR gate 188 until the time delay period produced by resistor 130 and capacitor 132 has expired. As pin 6 of timer 186 goes to logic level 1, pin 7 of timer 186 goes to logic level 0, which drops input 203 of NOR gate 190 to logic level 0. Since the vehicle has sustained an impact sufficient to trigger sensor 108, sensor 110 must also have been triggered at the same time, but this will have no effect on the initial triggering of the timer 186, which is only responsive at this stage to an input from sensor 108. Capacitor 132 then commences to recharge to the predetermined voltage at which the logic levels of pins 6 and 7 are restored to their initial value. If, on the other hand, at any time during this time delay period sensor 110 is actuated by a further minor impact of the vehicle, input 204 of NOR gate 190 switches to logic level 0, producing a falling pulse on pin 4 of timer 186, and effectively discharging capacitor 132. Consequently, the timing period is re-set, with the capacitor 132 commencing to recharge again once the internal circuitry of timer 186 has reacted to the falling pulse on pin 4.

Pin 7 of timer 186 is connected to one input 210 of NOR gate 194 via a capacitor 212. The other input 214 to NOR gate 194 is connected to pin 10 of timer 186, and the output from NOR gate 194 is connected to pin 12 of timer 186. Pin 9 of timer 186 is connected to the base of transistor 198 via a resistor 216. Pin 7 of timer 186 is also connected to pin 11 of timer 186 through a diode 218. In the initial state of timer 186, pin 12 is at a logic level 1 because the inputs 210, 214 of NOR gate 194 are both at logic level 0, pin 11 is at logic level 0, pin 10 is at logic level 0 and pin 9 is at logic level 1. In this initial state, transistor 198 is switched off, so no current is being transmitted through relay coil 174. When sensor 108 is activated, pin 7 of timer 186 goes to logic level 0, but this has no effect on NOR gate 194 because input 210 is already at a logic level 0. When the predetermined time period determined by resistor 130 and capacitor 132 expires, pin 7 of timer 186 changes from logic level 0 back to logic level 1. This change in logic level produces a rising pulse across capacitor 212 which momentarily changes the logic level of input 210 to a logic level 1, thus causing pin 12 to go to logic level 0. Once this happens, pin 14 of timer 186 is earthed, capacitor 182 discharges, and pin 9 of timer 186 goes to a logic level 0, switching on transistor 198 and supplying current to relay coil 174, thus closing relay 176 and supplying power through lines 178 and 180 to the respective electrically-operable actuators of the respective seat belt buckles of the system. Pin 9 of timer 186 stays latched to a logic level 0 until the capacitor 182 recharges back to the predetermined level determined by the characteristics of resistor 184 and capacitor 182. Once this point is reached, pin 9 of timer 186 goes back to the initial state of logic level 1, transistor 198 switches off, and current ceases to flow through relay 176 to the electrically-operable actuators of the seat belt buckles.

The manually-operable switch 196 is connected to pin 11 of timer 186 through a voltage regulator circuit comprising resistor 220 and Zener diode 221. This voltage regulator circuit is incorporated to protect the other components of the circuit of FIG. 3 from the battery voltage B+ to which the manually-operable switch 196 is connected. Resistor 222 limits the current that can flow from the junction between resistor 220 and Zener diode 221 to pin 7 of timer 186. When the circuit is in its initial state, that is, when neither sensor 108 nor sensor 110 is actuated, the closure of manually-operable switch 196 will cause pin 11 of timer 186 to go to a logic level 1, thus causing pin 9 of timer 186 to go to logic level 0, the transistor 198 to conduct, and the relay 176 to switch on, thus actuating the electrically-operable actuators in the seat belt buckles. When, however, actuation of sensor 108 occurs, pin 7 of timer 186 changes logic level from logic level 1 to logic level 0, and this results in the disabling of manually-operable switch 196, since closing this switch 196 will cause the current passing therethrough to flow to pin 7 of timer 186 through diode 218, without affecting the logic level of pin 11 of timer 186. Thus the manually-operable switch 196 remains disabled until pin 7 of timer 186 reverts to a logic level 1, which will not occur until the predetermined time delay period has expired.

The circuit shown in FIG. 3 of the drawings is protected from any false triggering of the timer 186 which may be produced during the initial switch-on period for the circuit by a similar arrangement as is used in the circuit shown in FIG. 2, namely the resistor 146 and capacitor 148 coupled to pins 3 and 13 of the timer 186. The circuit is designed to operate with a supply voltage from 9 to 24 volts, the Zener diodes in the circuit ensuring that the working voltage is regulated at 9.1 volts. The circuit as a whole is protected from any high voltage spikes in the supply by a Zener diode 224, and a resistor-capacitor circuit, comprising resistor 226 and capacitor 228, acts as a filter to filter out any frequencies in the supply above 10 Hertz.

A seat belt buckle emergency release system according to the present invention, when installed in a motor vehicle equipped with one or more releasable seat belt systems, provides an effective and unobtrusive means of automatically releasing the seat belt systems of the vehicle shortly after that vehicle has sustained an impact of sufficient severity at to warrant the immediate removal of the seat belt systems, with the added safeguard against premature automatic release of the seat belt systems before the vehicle has come effectively to rest. This emergency release system is in addition to the normal manual release system used on the seat belt systems, and the presence of the emergency release system in the motor vehicle does not detract in any manner from the efficiency of the manual release system of the seat belt systems concerned. Moreover, the emergency release system according to a preferred embodiment of the present invention includes the additional useful feature of a manually-operable switch for readily determining that the emergency release system is operational.

I claim:

1. A seat belt buckle emergency release system for use in a motor vehicle, which system includes an automatic latch plate release mechanism, an impact sensing means, and a timing mechanism interposed between said release mechanism and said impact sensing means, whereby, when said system is installed in said motor vehicle and said motor vehicle sustains an impact of a predetermined magnitude, a latch plate engaged in said seat belt buckle is ejected automatically therefrom a predetermined short period of time after said impact, characterised in that the latch plate release mechanism comprises an electrically-operable actuator coupled to a manual release mechanism of the seat belt buckle, the impact sensing means includes two acceleration-responsive sensing means, one of which is responsive only to a predetermined high acceleration indicative of vehicle impact and the other of which is responsive to a predetermined acceleration substantially lower than said predetermined high acceleration and indicative of substantial vehicle movement, and the timing mechanism is incorporated in an electronic timing and actuator operation circuit connected between said sensing means and, when the system is installed in said motor vehicle, said actuator, so that, when said motor vehicle sustains said impact, the timing portion of the circuit is actuated by said one sensing means to produce a set short time delay period before an electrical signal is generated by the actuator operation portion of the circuit to operate the actuator in the buckle, and any actuation of said other sensing means during said set short time delay period re-sets the timing portion to the starting point of said set short time delay period, whereby automatic ejection of said latch plate from said buckle will not occur before the vehicle has come to rest.

2. A seat belt buckle emergency release system according to claim 1, characterised in that the acceleration-responsive sensing means comprise two separate sensors, one of which is responsive only to said predetermined high acceleration, the other of which is responsive to said predetermined lower acceleration.

3. A seat belt buckle emergency release system according to claim 1 or 2, characterised in that the electrically-operable actuator is coupled to the manual release mechanism through a coupling means which, when said vehicle sustains said impact, is rendered disabled if the load exerted on a belt connected to said latch plate, by a vehicle occupant restrained by said belt, remains above a predetermined minimum loading after said impact, and remains disabled until the exerted load falls below said minimum loading, so as to prevent automatic ejection of said latch plate in the event of said vehicle occupant being suspended by said belt after the vehicle has come to rest.

4. A seat belt buckle emergency release system according to claim 1 or 2, characterised in that latch means are provided between a movable actuator member of the electrically-operable actuator and other components of the belt buckle latch plate release mechanism to retain said actuator member in a position to release the latch plate after the electrical signal from the actuator operation portion of the circuit ceases, until physical ejection of the latch plate occurs.

5. A seat belt buckle emergency release system according to claim 1 or 2, characterised in that the electrically-operable actuator comprises a solenoid having a movable armature serving as a movable actuator member thereof, said armature being spring-biased towards a manual release button of the manual release mechanism.

6. A seat belt buckle emergency release system according to claim 1 or 2, characterised in that the circuit includes a manually-operable test switch, the operation of which causes automatic ejection of said latch plate from said buckle unless said vehicle has sustained said impact and has not subsequently come to rest for said set short time delay period.

7. A seat belt buckle emergency release system according to claim 1 or 2, installed in said motor vehicle, characterised in that the motor vehicle is equipped with a plurality of individual seat belt systems, each of which is provided with a seat belt buckle incorporating one of said electrically-operable actuators, and the two acceleration-responsive sensing means and the electronic timing and actuator operation circuit are located within the motor vehicle with the actuator operation portion of the circuit coupled to each of the electrically-operable actuators so that actuation of the seat belt buckle emergency release system simultaneously operates all of the electrically-operable actuators in the motor vehicle.

* * * * *